United States Patent
Follero et al.

(10) Patent No.: US 11,356,402 B2
(45) Date of Patent: Jun. 7, 2022

(54) METHOD AND DEVICE FOR TRANSMITTING AN IP DATA PACKET TO AN IP ADDRESS

(71) Applicant: STMicroelectronics S.r.l., Agrate Brianza (IT)

(72) Inventors: Giulio Follero, Pozzuoli (IT); Sofia Massascusa, San Nicola la Strada (IT)

(73) Assignee: STMicroelectronics S.r.l., Agrate Brianza (IT)

(*) Notice: Subject to any disclaimer, the term of this patent is extended or adjusted under 35 U.S.C. 154(b) by 723 days.

(21) Appl. No.: 15/537,371

(22) PCT Filed: Nov. 9, 2015

(86) PCT No.: PCT/IB2015/058640
§ 371 (c)(1),
(2) Date: Jun. 16, 2017

(87) PCT Pub. No.: WO2016/097895
PCT Pub. Date: Jun. 23, 2016

(65) Prior Publication Data
US 2017/0346783 A1    Nov. 30, 2017

(30) Foreign Application Priority Data
Dec. 19, 2014 (IT) ............... TO2014A001070

(51) Int. Cl.
*H04L 12/58* (2006.01)
*H04L 29/12* (2006.01)
(Continued)

(52) U.S. Cl.
CPC .............. *H04L 51/38* (2013.01); *H04L 51/28* (2013.01); *H04L 61/1511* (2013.01); *H04W 4/14* (2013.01)

(58) Field of Classification Search
CPC ..... H04L 51/38; H04L 51/28; H04L 61/1511; H04W 4/14
See application file for complete search history.

(56) References Cited

U.S. PATENT DOCUMENTS 8,279,802 B1 * 10/2012 Singh ................ H04W 4/14
370/328
2006/0059337 A1 * 3/2006 Poyhonen ........... H04L 63/0428
713/165
(Continued)

FOREIGN PATENT DOCUMENTS

CN          1094449 A      11/1994
CN          1885833 A      12/2006
(Continued)

OTHER PUBLICATIONS

Issued by CNIPA, "Introduction to Computer Networks", DNS DHCP, Chinese Application No. 201580060187.7, Cited in Chinese Office Action dated Nov. 26, 2020, 6 pages.

*Primary Examiner* — Minjung Kim
(74) *Attorney, Agent, or Firm* — Slater Matsil, LLP

(57) ABSTRACT

A method for transmitting an IP data packet to an IP address associated with a host name is described. A first service message of a Short Message Service is transmitted to a Short Message Service gateway server. The first service message includes a host name resolution request for a host name. A second service message of the Short Message Service is received from the Short Message Service gateway server. The second service message includes an IP address associated with the host name. An IP data packet is transmitted to the IP address associated with the host name.

22 Claims, 5 Drawing Sheets

(51) Int. Cl.
*H04W 4/14* (2009.01)
*H04L 51/58* (2022.01)
*H04L 51/48* (2022.01)
*H04L 61/4511* (2022.01)

(56) References Cited

U.S. PATENT DOCUMENTS

| | | | |
|---|---|---|---|
| 2008/0085728 A1* | 4/2008 | Reding | H04M 1/72552 455/466 |
| 2008/0096590 A1* | 4/2008 | Celik | H04M 3/493 455/466 |
| 2008/0182621 A1* | 7/2008 | Morman | H04W 24/00 455/558 |
| 2010/0077023 A1 | 3/2010 | Eriksson | |
| 2011/0130121 A1 | 6/2011 | Patel et al. | |

FOREIGN PATENT DOCUMENTS

| | | |
|---|---|---|
| CN | 101064647 A | 10/2007 |
| GB | 2406999 A | 4/2005 |
| WO | 2011139952 A1 | 11/2011 |

* cited by examiner

METHOD AND DEVICE FOR TRANSMITTING AN IP DATA PACKET TO AN IP ADDRESS

CROSS-REFERENCE TO RELATED APPLICATIONS

This patent application is a national phase filing under section 371 of PCT/IB2015/058640, filed Nov. 9, 2015, which claims the priority of Italian patent application TO2014A001070, filed Dec. 19, 2014, each of which is incorporated herein by reference in its entirety.

TECHNICAL FIELD

Embodiments of the present disclosure relate to techniques for transmitting at least one Internet Protocol (IP) data packet to an IP address being associated with a host name.

In this respect, embodiments of the present disclosure relate to techniques for resolving a host name, in particular in a mobile communication network.

BACKGROUND

FIG. 1 shows the basic architecture of a communication system being based on the Internet Protocol (IP).

In the example considered, a first host 10, such as a PC or a smartphone, sends via a communication network 20 an IP data packet to a second host 30, such as a web server.

For example, the communication network 20 may be a Local Area Network (LAN) or a Wide Area Network (WAN), such as the internet, or a combination of both.

Accordingly, both the first and the second host 10 and 30 comprise some kind of a communication interface for connection to the network 20.

For example, for this purpose the host 10 may comprise an Ethernet network adaptor, a WiFi (Wireless Fidelity) transceiver and/or a mobile transceiver, such as a CDMA (Code Division Multiple Access) transceiver, a W-CDMA (Wideband Code Division Multiple Access), UMTS (Universal Mobile Telecommunications System), HSPA (High-Speed Packet Access) or LTE (Long Term Evolution) transceiver.

According to the IP protocol, each host has associated at least one IP address. For example, according to the version 4 of the IP protocol, each host has an IP address comprising 32 bit, which are usually expressed with four consecutive numbers in the range between 0 and 255. For example, the host 1 may have associate the IP address "123.123.123.123" and the second host may have associated the IP address "234.234.234.234".

Specifically, in order to send data to the host 30, the host 10 sends an IP packet comprising an IP header IP_H and as payload the respective IP data IP_D to the network 20, wherein the IP header IP_H contains at least the source address of the sender, i.e. the IP address of the host 10, and the destination address of the target, i.e. the IP address of the host 30.

Generally, as shown in FIG. 2, the IP data IP_D may not comprise directly the application data D, but the application data D may first be encapsulated in a transport layer packet, such as a User Datagram Protocol (UDP) or a Transmission Control Protocol (TCP) packet, which in turn comprise a header H and as payload the data D, i.e. the IP data IP_D may comprise an additional transport layer header H and the application data D.

For example, the UDP or TCP headers permit to specify an additional port number for the communication. The differences between the UDP and the TCP protocol are well known to those skilled in the art, rendering a more detailed description herein superfluous. Basically, the TCP protocol is more complex in order to permit a more reliable transmission of data by using, e.g., flow control, sequence numbering and checksums.

Another core feature of the internet protocol is the Domain Name System (DNS). Basically, as explained in the forgoing, the IP protocol is based on a communication between a source IP address and a destination IP address, which may also change over time. Thus, in order to permit a simpler identification of the various hosts in the network, a "domain name" or "hostname", usually in the form of Fully Qualified Domain Name (FQDN) may be associated with each host. In this case, a domain name server 40 translates these host names in the numerical IP addresses required for the IP communication.

Specifically, as shown in FIG. 3, a DNS server 40 is connected also the network 20 and has associated a given IP address, such as, e.g., "56.56.56.56". In this case, the host 10 has stored in some way the IP address of the DNS server 40. For example, as well known to the skilled in the art, the DNS server's IP address may be stored together with the other configuration information of the IP protocol or this information may be obtained from a Dynamic Host Configuration Protocol (DHCP) server.

Accordingly, when trying to contact a given domain name, such as "www.abc.com", the host 10 sends a DNS request to the DNS server 40 containing the requested domain name and, in case the domain name exists, the DNS server 40 returns the IP address associated with the domain name, e.g., the IP address of the host 30. At this point the host 10 knows the IP address of the host 30 and may generate the corresponding IP header IP_H and send the IP packet to the network 20.

For example, according to the standard RFC 1034 and RFC 1035, the DNS communication is primarily based on the UDP protocol and the destination port number 53.

The IP protocol is nowadays often used for the exchange of data in mobile communication networks.

For example, as shown in FIG. 4, the host 10 may be a mobile device, such as a smartphone or a tablet, connected to a base station BS of a mobile operator.

In this case, the IP packets may be transmitted from the mobile device 10 to the base station BS, and the base station BS forwards the IP packets to a network 20*a* of the mobile operator. Generally, this network 20*a* may comprise one or more hosts 30*a*, such as web or application servers, offering services to the mobile device 10. Usually, the network 20*a* is also connected via a router 20*b*, possibly implementing also a firewall, to the internet 20*c* to which may be connected further hosts 30*b*.

Accordingly, by using an application, such as a web browser, the mobile device 10 may communicate with the hosts 30*a* and/or 30*b* sending via the base station BS IP packets to the network 20.

FIG. 5 shows in that respect a possible architecture of a mobile device 10.

Generally, the mobile device 10 comprises one or more processors 102 connected to one or more memories 104. The mobile device 10 comprises moreover at least on communication interface 106 for communication with a base station BS, such as a GSM, UMTS or LTE transceiver, and a user interface 110, such as a touchscreen.

For example, in the memory 104 may be stored an operating system OS being executed by the processor 102 and which manages the general functions of the mobile device 10, such as the management of the user interface no and the establishment of a connection to the base station BS via the interface 106, including also the management of the IP protocol. The memory may also contain applications being executed by the operating system OS. For example the memory 104 may comprise a web browser application WB.

For establishing a connection with the base station BS, the mobile device 10 comprises moreover means for obtaining the identity identification of the user. For example, usually the mobile device comprises a card holder for receiving a card comprising a Subscriber Identity Module (SIM). Generally a corresponding module may also be installed directly within the mobile device 10.

For example, nowadays is often used a Universal Integrated Circuit Card (UICC), which is a smart card often used in GSM and UMTS networks. The UICC ensures the integrity and security of all kinds of personal data, and it typically holds a few hundred kilobytes.

For example, in a GSM network, the UICC contains a SIM application and in a UMTS network a USIM application. A UICC may contain several applications, making it possible for the same smart card to give access to both GSM and UMTS networks, and also provide storage of a phone book and other applications.

Thus, generally, also the UICC 108 comprises at least one processing unit and at least one memory and permits the execution of applications directly within the UICC.

As mentioned in the foregoing, the UICC may be integrated directly in the mobile device and is in this case often called embedded UICC (eUICC).

Generally, also other applications may be stored on the UICC, which may also communicate with other hosts via the IP protocol.

For example FIG. 6 shows a scenario, wherein the UICC contains an application UICC_APP configured for accessing dynamic content on a remote server 30, such as the server 30a in the network of the mobile operator. For this purpose, the UICC may transmit IP data packets to or receive IP data packets from the network 20 by means of the communication interface 106. Generally, the UICC 108 may communicate directly with the communication interface 106 or indirectly, e.g., via the processor 102 of the mobile device 10, possibly using also functions of the operating system OS.

For example, the mobile device 10 may use the web browser WB being executed by the processor 102 for accessing a web server application UICC_APP being executed on the UICC. This web server application may have stored local content and/or may access remote content on the host 30.

For example, the web server application UICC_APP may request a web page from the remote host 30 and transmit the web page having been received from the host 30 to the web browser application WB. For example, these web pages may be used in order to manage the user's mobile phone contract, administration commands or may contain any other web based content.

Accordingly, the applications UICC_APP being executed on the UICC are subject to the same problems with regards to the host names described with respect to FIG. 3.

In fact, in order to obtain content from a remote server, also the application UICC_APP has to be able to access a given host. Thus, either the IP address of the remote host 30 has to be stored directly in the application UICC_APP or the IP address associated with a given FQDN domain name has to be obtained from a DNS server 40. For this purpose, the IP address of the DNS server 40 may be stored in the application UICC_APP. Alternatively, as also specified in the standard ETSI 102 223, the IP address of the DNS server may be obtained from the device 10, e.g., by sending a specific request from the UICC application UICC_APP to the operating system OS being executed on the processor 102. Accordingly, in this case, the processor 102 provides the IP address of the DNS server to the UICC 108. Finally, once obtained the IP address of the DNS server 40, the UICC application UICC_APP may connect via the communication interface 106 to the DNS server 40 and retrieve the IP address associated with the FQDN host name stored in the application UICC_APP.

Accordingly, by using the conventional DNS resolver service, a re-iterative mechanism is required if some errors occur. For example, if the DNS resolver request is unable to obtain the IP address associated with a given FQDN, a new DNS resolver request has to be processed. Every time this happens, the UICC card has to manage a new UDP channel. However, due to the hierarchical architecture of the domain name system, such errors are likely to occur.

Moreover, in order to perform a DNS request, the UICC application UICC_APP has to open a further channel, i.e. a UDP channel required to communicate with the DNS server 40. Moreover, if the connection with the DNS server 40 is not available and the DNS server 40 does not respond, a new tentative to reach another DNS server is typically operated. In this case a second UDP channel has to be managed by the UICC card.

SUMMARY

One or more embodiments are related to a processing module, a related mobile device and a related host name resolution server, as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

As mentioned in the foregoing, the present description provides solutions for resolving a host name in a mobile communication network, such as a GSM or UMTS mobile communication network.

Several embodiments are particular useful when an application installed on a SIM card, such as a Universal Integrated Circuit Card (UICC) or generally a processing module, has to transmit at least one IP data packet to an IP address being associated with a host name.

For example, in several embodiments, the UICC is configured to transmit (e.g., via a mobile device) a first service message of the Short Message Service to a Short Message Service gateway server, wherein the first service message comprises a host name resolution request for the given host name. In response to this first message, the UICC receives from the Short Message Service gateway server a second service message of the Short Message Service. In particular, this second service message may comprise either an error message or the IP address associated with the host name.

Accordingly, once obtained the IP address associated with a host name, the UICC may transmit at least one IP data packet to the IP address associated with the host name.

Conversely, the host name resolution server according to the present description is configured to receive a first service message of the Short Message Service from a mobile device, wherein the first service message comprises a host name resolution request for a host name.

In some embodiments, the host name resolution server determines by means of a local database and/or at least one remote Domain Name System server an IP address associated with the host name and transmits a second service message of the Short Message Service to the mobile device, wherein the second service message comprises the IP address associated with the host name.

For example, in several embodiments, the first service message is sent by means of an application installed on an UICC, wherein a code is associated with the application. In this case, both the first and the second service message contain preferably this code identifying the application. For example, in this case, the mobile device and the UICC may forward the second service message to the correct application.

In some embodiment, the first and/or the second service message may be encoded prior to transmission, e.g., by means of data compression and/or data encryption.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following FIGS. 7 to 10 parts, elements or components which have already been described with reference to FIGS. 1 to 6 are denoted by the same references previously used in such Figures; the description of such previously described elements will not be repeated in the following in order not to overburden the present detailed description.

The embodiments here described offer solutions that permit to obtain the IP address associated with a given host name, such as a domain name, in particular a fully qualified domain name (FQDM).

Figure 1:
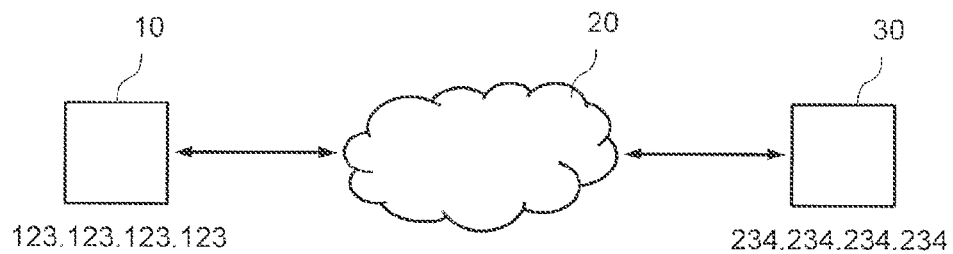
FIGS. 1 to 6 have already been described in the foregoing.
Figure 2:
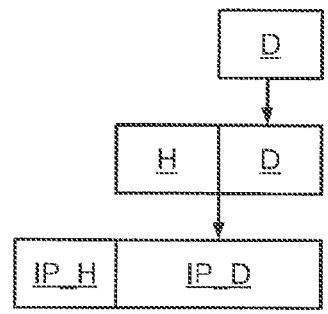
Figure 3:
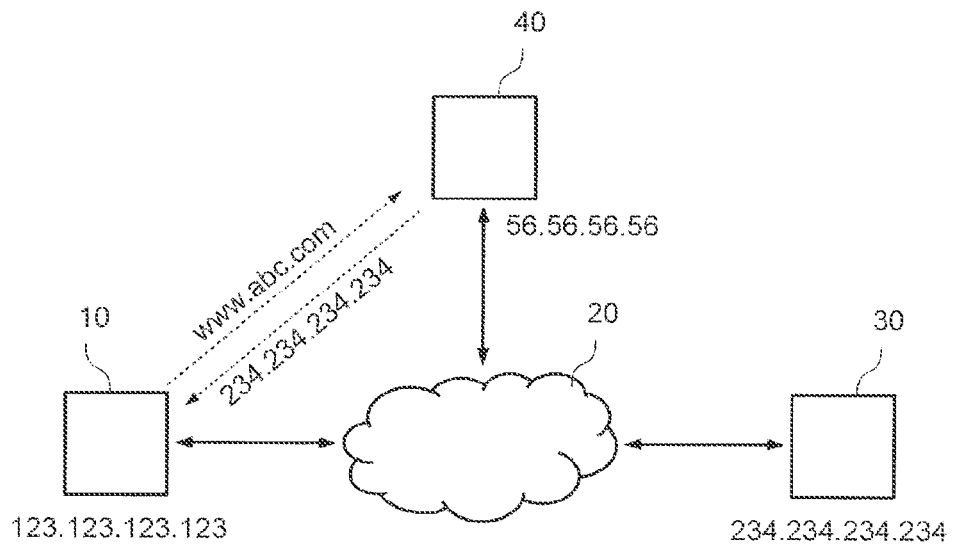
Figure 4:
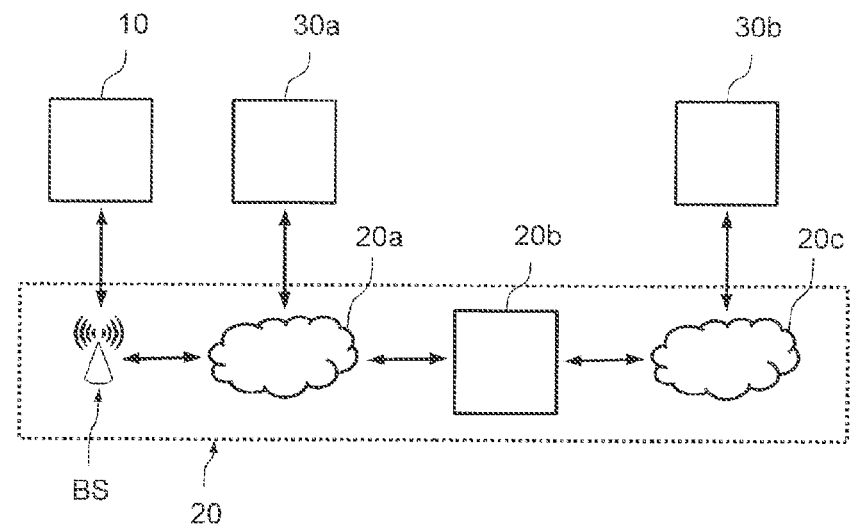
Figure 5:
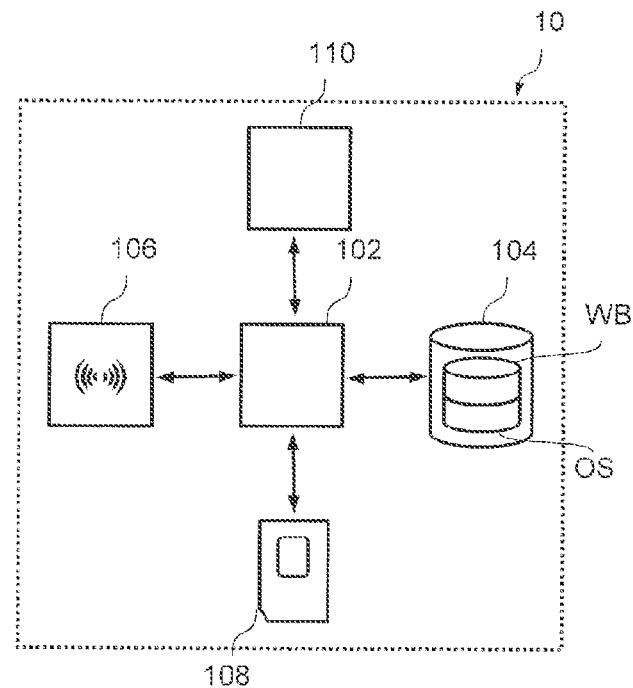
Figure 6:
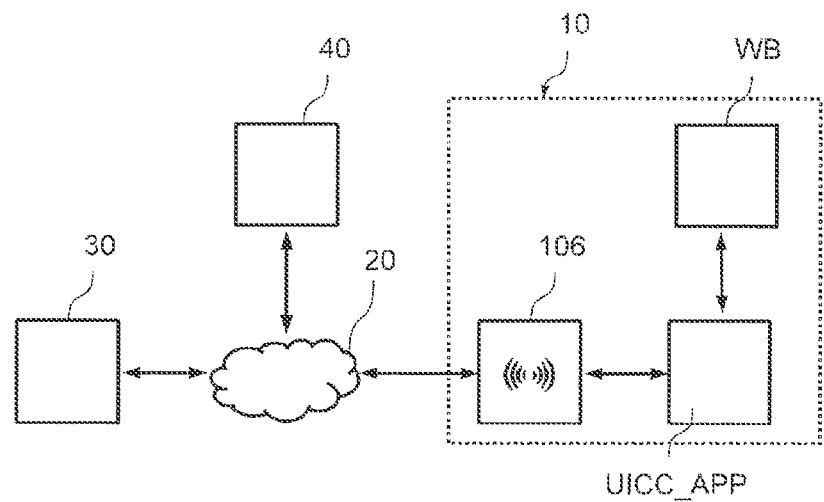
Figure 7:
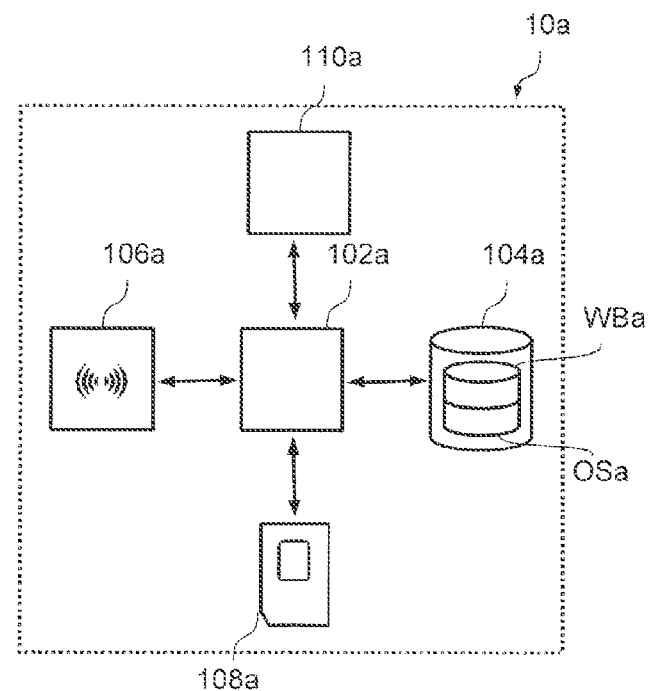
FIG. 7 shows an embodiment of a mobile device in accordance with the present disclosure.
Figure 8:
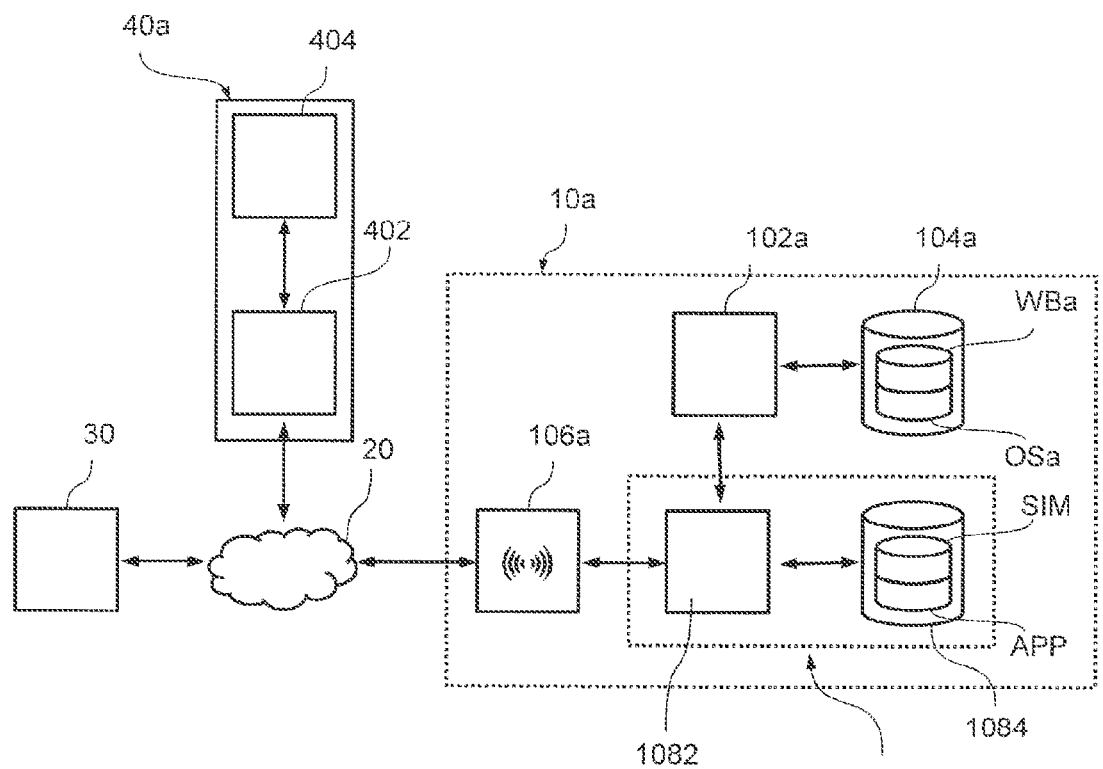
FIG. 8 shows an embodiment of a mobile communication system in accordance with the present disclosure.

FIGS. 7 and 8 show in that respect embodiments of a mobile device and a mobile communication system in accordance with the present disclosure.

Specifically, also in this case, a mobile device boa, such as a mobile phone or a tablet, comprises a mobile communication interface 106a, such as a GSM, GPRS, UMTS, HSPA or LTE communication interface, for establishing a data connection with at least one base station BS for exchanging data with a communication network 20, i.e., transmitting data to and receiving data from the network 20. For example, as shown already in FIG. 4, the network 20 may comprise a private network 20a of the mobile operator and a public network 20c, such as Internet. Accordingly, reference can be made to the description of FIG. 4 for a possible embodiment of the network 20.

Again, the mobile device 10a comprises moreover one or more processors 102a connected to one or more memories 104a and a user interface 110a, such as a touchscreen. For example, in the memory 104a may be stored an operating system OSa being executed by the processor 102a and which manages the general function of the mobile device 10a, such as the management of a user interface 110a and the establishment of a connection to the base station BS via the interface 106a. The memory 104a may also contain further applications being executed by the operating system OSa, such as a web browser application WBa.

In the embodiment considered, the mobile device boa has coupled a processing module 108a comprising a Subscriber Identity Module (SIM). Accordingly, generally, the processing module 108a comprises one and more processors 1082 and one or more memories 1084 for executing applications stored in the memory 1084 of the module 108a (see e.g., FIG. 8).

For example, in an embodiment, the mobile device 10a comprises a card holder and the processing module 108a is provided on a smart card, such as a UICC. However, generally, the processing module 108a may be integrated directly within the mobile device boa. Accordingly the processing module 108a may also correspond to an embedded UICC.

In the embodiment considered, the processing module 108a comprises in addition to the Subscriber Identity Module application (reference sign SIM in FIG. 8) at least one further application APP. Specifically, this application APP is configured to communicate (directly or indirectly via the processor 102a and possibly the operating system OSa) with the communication interface 106a in order to send data to and receive data from the network 20.

In particular, in an embodiment, the application APP is configured to communicate with the remote server by means of the IP protocol. For example, the communication may be initiated periodically, by means of a user input performed via the mobile device 10a and/or through a remote management command received, e.g., via a service SMS, from a server of the mobile operator.

As outlined in the foregoing, in this case, it is preferable that the application APP has stored a host name identifying the remote server 30, and that a host name resolution server 40a is used to obtain the IP address of the server 30 being associated with the logic name.

Figure 9:
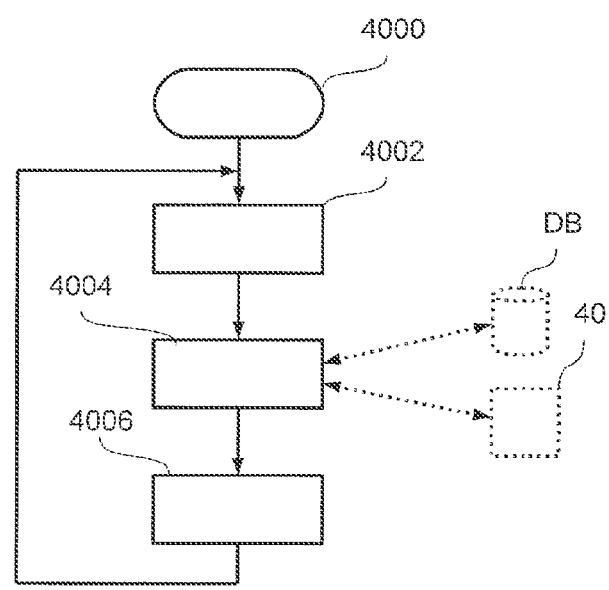
FIG. 9 is a flowchart showing an embodiment of a method for resolving a host name in the mobile communication system of FIG. 8.

FIG. 9 shows in this respect a flowchart of an embodiment of the server 40a.

After a start step 4000, the server 40a receives a request from a mobile device 10a comprising at least one host name identified by means of a code, such as a string or a number. For example, in an embodiment, a string is used which contains a fully qualified domain name (FQDN). Accordingly, at the step 4002, the server 40a analyses the request and determines at least the host name and the identity of the mobile device 10a having sent the respective request, and preferably also the application APP having sent the request.

Next, at a step 4004, the server 40a determines the IP address for the host name.

For example, the server 40a may be connected to a database DB, in which are stored the host names and the respective IP address. In this case, the host names may also be identified simple numbers or alphanumerical stings, and not necessarily by FQDN names.

Conversely, in an embodiment, the hosts are identified with conventional DNS domain names, i.e. fully qualified domain names, being composed of a top level domain and one or more further domain sub-strings, e.g., "www.abc.com". In this case, the server 40a may forward a DNS request comprising this FQDN to one or more conventional DNS servers 40. Generally, the mobile device 10a may also submit only a host name, e.g., "www" and the server 40a may append a default domain name, e.g., "abc.com", thereby creating a FQDN to be used for a conventional DNS request as described in the introduction of the present description.

Generally, the above solutions may also be combined. For example, the server may first determine whether a local database DB contains the IP address for the given host name, and only in case the host name is not stored in the local database, the server 40a may generate and transmit a DNS resolution request to a DNS server 40 following the previously described Domain Name System (DNS) standard protocol.

Accordingly, at the end of the step 404, the server 40a has obtained the IP address associated with a given host name or has determined that no IP address is associated with the host name.

At a step 4006, the server 40a transmits the result of the host name resolution or lookup, i.e. either an error message indicating that the host name does not exist or the IP address associated with the hostname, to the mobile device 10a.

Finally, the procedure may terminate, or proceed at the step 4002 in order to manage further host name resolutions.

In an embodiment, instead of using the IP protocol, the Short Message Service is used for the communication between the mobile device boa and the host name resolution server 40a, i.e. the mobile device boa sends a SMS to the server 40a containing a request for resolving a given hostname and the server 40a transmits a SMS to the mobile devices boa containing the IP address associated with the host name. For this purpose, the server 40a may indeed by implemented also in a distributed manner by means of several physical computers, wherein a first server 402 operates as a SMS gateway server and second server 404 performing the DNS resolution procedure. However, these servers may also be implements by means of two or more applications being installed on the same physical computer.

Specifically, most of the mobile operators manage a SMS network. For example, in the context of a Universal Mobile Telecommunications System (UMTS), reference can be made to the technical specification ETSI TS 123 040 "Technical realization of the Short Message Service (SMS)". Basically, such SMS massages may be used to send text message between different mobile devices. However, SMS messages may also be used at a service level, e.g., in order to configure the SIM card. These SMS messages are usually invisible to the final user.

Similarly, also applications being executed by the SIM card, or generally the processing module 108a, may send service messages to the mobile operator by means of the SMS standard.

These SMS messages contain usually header information comprising a code identifier the application that has sent the message and a code that specifies the kind of SMS (e.g., in the normal text message the T-PID field in the header is set to '00'). Specifically, as described in the technical specification ETSI TS 101 220, "Smart Cards; ETSI numbering system for telecommunication application providers", each "Toolkit Application", i.e. the applications installed on an UICC, may have associated a given unique code also called "Toolkit Application Reference" (TAR).

Accordingly, by receiving a SMS message, the mobile operator, in particular the server 40a, is able to determine:

a) which mobile device boa has sent the SMS, e.g., by determining the phone number of the SMS sender, and b) which smartcard application has sent the SMS, e.g., by determining the TAR code in the SMS header.

Accordingly, in the embodiment considered, the server 40a receives at the step 4002 a SMS message from the mobile device boa, wherein this SMS message contains a hostname and, once the associate IP address has been determined, the server 40a sends a service SMS message containing this IP address to the mobile device, wherein the message is preferably addressed to the specific application APP, e.g., by including again the TAR in the SMS header information.

Figure 10:
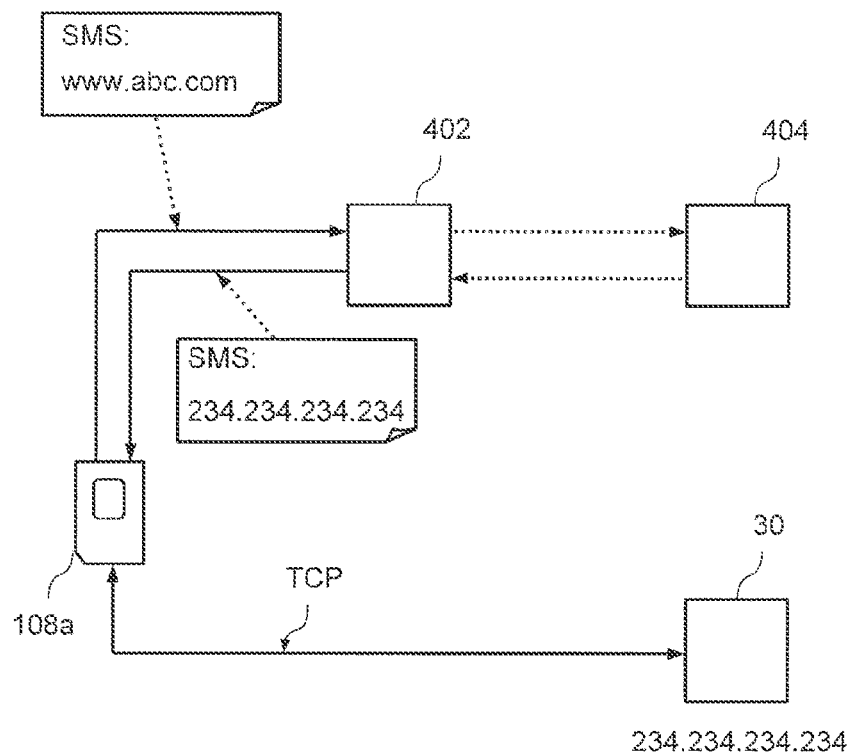
FIG. 10 shows an embodiment of the exchange of communications in the mobile communication system shown in FIG. 8.

FIG. 10 shows in this respect the exchange of communications in a mobile communication system in accordance with the present disclosure.

In case an application of the UICC card, or general the processing module 108a, has to access a given host, such as a web server 30 identified with a given host name, such as a FQDN (e.g., "www.abc.com"), the processing module 108a, in particular the application APP of the module 108a, sends a service message according to the SMS standard to a SMS gateway server 402. Preferably, the SMS contains the TAR of the application APP, thereby identifying the application APP.

The SMS gateway 402 receives this SMS message and processes the SMS message in order to extract the host name (e.g., "www.abc.com") and the other information which permit to identify the mobile device 10a, and preferably also the application APP.

Next the SMS gateway 402 forwards the host name to the host name resolver server 404, which in turn determines the IP address associated with the host name. Generally, any protocol may be used for the communication between the SMS gateway 402 and the host name resolver 404, such as an IP communication. As explained in the foregoing, the host name resolver 404 may use for this purpose a local database and/or remote DNS server 40 by relying on the DNS protocol. In response to this request, the domain resolver 404 returns the result of the host name resolution or lookup, i.e. either an error message or the IP address associated with the host name, to the SMS gateway 402. For example, in the embodiment considered, the domain resolver 404 returns the IP address "234.234.234.234" for the host name "www.abc.com".

At this point, the gateway 402 sends a service message of the SMS standard to the mobile device boa, preferably directly to the application APP by specifying the identity of the application APP, e.g., the TAR, in the header of the message. For example, in the embodiment considered, the SMS gateway sends a message containing as payload the IP address "234.234.234.234". Generally, also a plurality of IP addresses may be returned for a single host name.

Generally, the payload of the SMS messages exchanged between the module 108a and the SMS gateway 402 may also be encoded prior to transmission, e.g., in order to compress and/or encrypt the content of the message, thereby increasing security with respect to the traditional DNS system which relies usually on the use of insecure UDP messages.

Accordingly, once the module 108a, in particular the application APP, has received the SMS containing the result of the host name resolution, the application APP can decide if the result corresponds to a valid IP address and contact the IP address via the IP protocol, e.g., by using a TCP or UDP communication.

For example, in case the server 30 is a web server, the module 108a, in particular the application APP, may send a HTTP (Hypertext Transfer Protocol) or HTTPS (HyperText Transfer Protocol over Secure Socket Layer) request to the IP address in order to obtain, e.g., a web page, an administration command, a file or any other static or dynamic content.

Accordingly, the solutions described herein permit that an application installed on a processing module, such as a UICC or eUICC, may obtain the IP address associated with a given host name in a more effective way, without having to rely on the burdensome DNS protocol.

Figure 11:
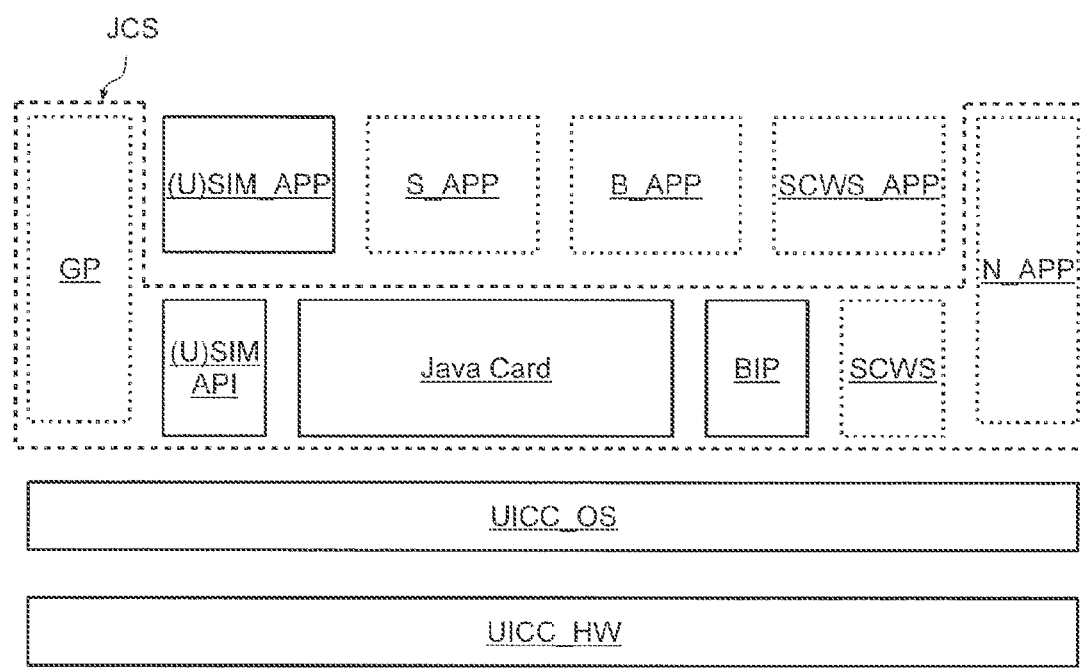
FIG. 11 shows an embodiment of an Universal Integrated Circuit Card in accordance with the present disclosure.

FIG. 11 shows in this respect an embodiment of the software layers of an UICC card 108a.

In the embodiment considered, the UICC 108a comprises a hardware layer UICC_HW being represented (at least) by the processor 1082 and the memory 1084. On top of the hardware layer UICC_HW runs an operating system UICC_OS of the UICC card. For example, the operating system UICC_OS may manage a plurality of applications, such as the applications SIM and APP described in the foregoing.

Specifically, in the embodiment considered, the UICC card is based on the "UICC Application Programming Interface (UICC API) for Java Card™" as specified, e.g., in the technical specification ETSI TS 102 241, e.g., version 9.1.0.

In this case, a Java Card System JCS is executed by the operating system UICC_OS, which manages and runs applets, i.e. applications using the APIs (Application Programming Interface) provided by the Java Card System JCS.

For example, the Java Card System JCS comprises usually a SIM or USIM API (identified with the reference sign (U)SIM API) which manages the basic Subscriber Identity Module commands and provides functions to higher level SIM or USIM applets (identified with the reference sign U)SIM_APP). For example, the (U)SIM API may also manage the communication functions of the Short Message Service.

In the embodiment considered, the UICC is also configured for managing at least one Bearer Independent Protocol (BIP), such as GPRS, EDGE, UMTS, HSPA or LTE. For example, in the embodiment considered, the Java Card System JCS comprises a Bearer Independent Protocol API BIP.

The Java Card™ Platform provides a JAVA™ runtime environment, which is particularly optimized for smart cards. This technology is well known to those skilled in the art, rendering a more detailed description herein superfluous. The Java Card System JCS may also comprise a GlobalPlatform module GP according to the "GlobalPlatform Card specification", e.g., version 2.2. Also this standard is well known to those skilled in the art, rendering a more detailed description herein superfluous. Basically, the GP module provides features such as user authentication through secure channels, or the installation and remote management of the applets.

The above described API functions may then be used by the applets, such as the SIM or USIM applet (U)SIM_APP, a basic applet B_APP and/or a secure applet S_APP, which uses, e.g., one of the encryption methods provided by the GlobalPlatform API.

The UICC 108 may comprise also further applications, such as a Smart Card Web Server SCWS and possible Web server applets SCWS_APP, which, e.g., perform the above mentioned web server function.

Generally, the UICC 108a may comprise not only custom applets but also native low level applications N_APP being executed directly by the operating system UICC_OS.

Generally, the above described host name resolution method may be implemented at any of the previously described software layers, i.e. in the operating system UICC_OS, at the API level or at the application level.

For example, an applet, such as the applets S_APP, B_APP or SCWS_APP, could access the (U)SIM API in order to send the first service SMS comprising the host name resolution request to the SMS gateway 402 and receive the second service SMS comprising the respective IP address from the SMS gateway 402. Next, the applet may access the Bearer Independent Protocol API in order to establish the IP data connection with the remote host 30. Accordingly, in this case, the applet does not have to implement the complex DNS protocol.

Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. A method comprising:
transmitting a first service message of a Short Message Service to a Short Message Service gateway server, the first service message comprising a host name resolution request for a host name, wherein the host name is associated with a remote server, the remote server being a device that is different from the Short Message Service gateway server;
processing the host name resolution request using a communication channel between the Short Message Service gateway server and a host name resolution server that is different from the remote server;
receiving, from the Short Message Service gateway server, a second service message of the Short Message Service, the second service message comprising an IP address associated with the remote server; and transmitting an IP data packet to the IP address associated with the remote server.

2. The method of claim 1, wherein the first service message is sent by an application, and wherein the first and the second service messages contain a code identifying the application.

3. The method of claim 1, further comprising encoding the first service message prior to transmitting the first service message.

4. The method of claim 3, wherein encoding the first service message comprises encrypting the first service message.

5. The method of claim 3, wherein encoding the first service message comprises performing data compression of the first service message.

6. A non-transitory computer-readable medium that stores software code that can be executed on a computer device, the software code including instructions for implementing the method of claim 1.

7. A computer-implemented device comprising:
 a communication interface configured to transmit an IP data packet to an IP address associated with a host name;
 a processor; and
 a memory coupled to the processor and storing software code that can be executed on a computer device, the software code including instructions for implementing a method comprising:
  transmitting a first service message of a Short Message Service to a Short Message Service gateway server, the first service message comprising a host name resolution request for the host name, wherein the host name is associated with a remote server, the remote server being a device that is different from the Short Message Service gateway server;
  processing the host name resolution request using a communication channel between the Short Message Service gateway server and a host name resolution server that is different from the remote server;
  receiving from the Short Message Service gateway server a second service message of the Short Message Service, the second service message comprising an IP address associated with the remote server; and
  transmitting an IP data packet to the IP address associated with the remote server.

8. The device of claim 7, wherein the device is incorporated in a Universal Integrated Circuit Card.

9. The device of claim 7, wherein the device comprises an embedded Universal Integrated Circuit Card.

10. The device of claim 7, wherein the memory comprises a Subscriber Identity Module application that stores an application for implementing the method.

11. The device of claim 7, further comprising a further processor and a further memory, wherein the further memory stores an application, which, when executed on the further processor, communicates with the processor.

12. A method for resolving a host name, the method comprising:
 receiving, at a Short Message Service gateway server, a first service message of a Short Message Service from a mobile device, the first service message comprising a host name resolution request for the host name, wherein the host name is associated with a remote server, the remote server being a device that is different from the Short Message Service gateway server;
 determining, by use of a communication channel between the Short Message Service gateway server and a local database and/or a remote Domain Name System server, an IP address associated with the remote server, wherein the local database and the remote Domain Name System server are different from the remote server; and
 transmitting, by the Short Message Service gateway server, a second service message of the Short Message Service to the mobile device, the second service message comprising the IP address associated with the remote server.

13. The method of claim 12, wherein the first service message is received from an application, and wherein the first and the second service messages contain a code identifying the application.

14. The method of claim 12, further comprising encoding the second service message prior to transmitting the second service message.

15. The method of claim 14, wherein encoding the second service message comprises encrypting the second service message.

16. The method of claim 14, wherein encoding the second service message comprises performing data compression of the second service message.

17. A non-transitory computer-readable medium that stores software code that can be executed on a computer device, the software code including instructions for implementing the method of claim 12.

18. A Short Message Service gateway server comprising:
 a processor; and
 a memory coupled to the processor and storing software code that can be executed on a computer device, the software code including instructions for implementing a method comprising:
  receiving, at the Short Message Service gateway server, a first service message of a Short Message Service from a mobile device, the first service message comprising a host name resolution request for a host name, wherein the host name is associated with a remote server, the remote server being a device that is different from the Short Message Service gateway server;
  determining, by use of a communication channel between the Short Message Service gateway server and a local database and/or a remote Domain Name System server, an IP address associated with the remote server, wherein the local database and the remote Domain Name System server are different from the remote server; and
  transmitting, by the Short Message Service gateway server, a second service message of the Short Message Service to the mobile device, the second service message comprising the IP address associated with the remote server.

19. The server of claim 18, further comprising the local database, wherein determining the IP address associated with the host name comprises using the local database to determine the IP address associated with the host name.

20. The server of claim 18, wherein the Domain Name System server is implemented as software executed by the processor, wherein determining the IP address associated with the host name comprises determining the IP address associated with the host name by use of the Domain Name System server.

21. The server of claim 18, wherein determining the IP address associated with the host name comprises determining the IP address associated with the host name by use of a remote Domain Name System server.

22. A method comprising:

transmitting, from a client, a first Short Message Service (SMS) message to an SMS gateway server, the first SMS message comprising a host name resolution request for a host name, wherein the host name is associated with a remote server, the remote server being a device that is different from the SMS gateway server;

receiving, by the client and from the SMS gateway server, a second SMS message comprising an IP address associated with the remote server, wherein the client avoids direct communication with a domain name system (DNS) server processing the host name resolution request for the host name associated with the remote server by sending the first SMS message to the SMS gateway server and receiving the second SMS message from the SMS gateway server; and transmitting, from the client, an IP data packet to the IP address associated with the remote server.

* * * * *